United States Patent [19]

Whiting

[11] 4,189,945

[45] Feb. 26, 1980

[54] SEISMIC RESPONSIVE OPERATING DEVICE

[76] Inventor: Sheldon G. Whiting, 3488 Albee St., Eureka, Calif. 95501

[21] Appl. No.: 955,636

[22] Filed: Oct. 30, 1978

[51] Int. Cl.² ........................ H01H 35/14; G01V 1/16

[52] U.S. Cl. .............................. 73/652; 200/DIG. 29

[58] Field of Search ............... 73/652, 514; 340/17 R; 200/DIG. 29, 61.45 R, 61.46; 74/2

[56] References Cited

U.S. PATENT DOCUMENTS

| | | | |
|---|---|---|---|
| 1,645,122 | 10/1927 | Wallace | 200/DIG. 29 |
| 3,730,004 | 5/1973 | Cwycyshyn et al. | 73/514 |
| 4,007,643 | 2/1977 | Matsushita | 74/2 |
| 4,086,807 | 5/1978 | Nakada | 73/652 |

*Primary Examiner*—Stephen A. Kreitman
*Attorney, Agent, or Firm*—George B. White

[57] ABSTRACT

A seismic responsive operating device in which a sphere supported on a seat on the top of a column with a spiral guideway around the columns to guide the sphere against a lock lever for releasing a compressed spring, a spring loaded operating arm is capable of lifting the locking lever to out of the way position to allow the arm to operate a device.

8 Claims, 9 Drawing Figures

SEISMIC RESPONSIVE OPERATING DEVICE

BACKGROUND OF THE INVENTION

There are already known numerous types of safety devices which automatically operate when vigorously shaken so as to shut off gas valves or electric circuits, or the like. However, many of the prior art devices known to applicant are complicated in arrangement and not positive in operation especially with respect to positively preventing accidental actuation.

The primary object of this invention is to provide a device which positively holds the actuating or operating element in inoperative attitude until such time that a vibration in excess of a predetermined degree displaces a sphere for releasing the means which holds the actuating or operating element in inoperative position.

To attain the primary object of the invention, the herein device of this invention utilizes a compression spring which is held down by a cocked pin engaged by a locking lever so that the actuating or operating element is positively held in inactive or inoperating position and a ball supported in an attitude above the said locking device so that it requires an earthquake to dislodge the same and then it is positively guided by a spiral guide to the locking lever so that as it moves it increases its velocity of movement and its impact upon the lever moves the locking lever out of the pin thereby to release the cocked spring and release the pressure on the locking element thereby to allow the spring loaded actuating element to push the locking lever out of the way and operate a valve or an electric switch.

DETAILED DESCRIPTION

Figure 2:
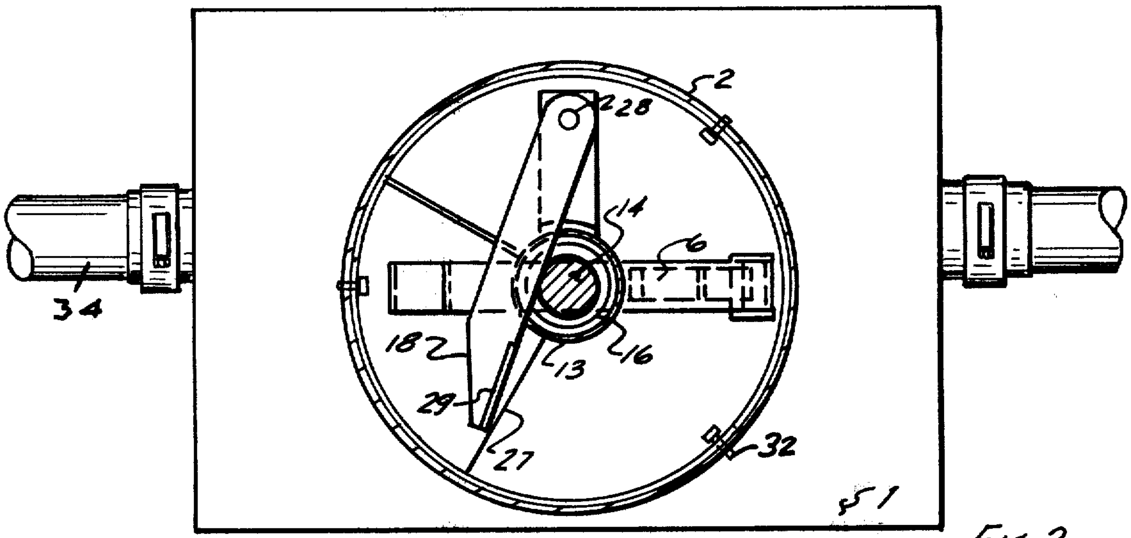
FIG. 2 is a cross-sectional view taken on lines 2—2 of FIG. 1.
Figure 1:
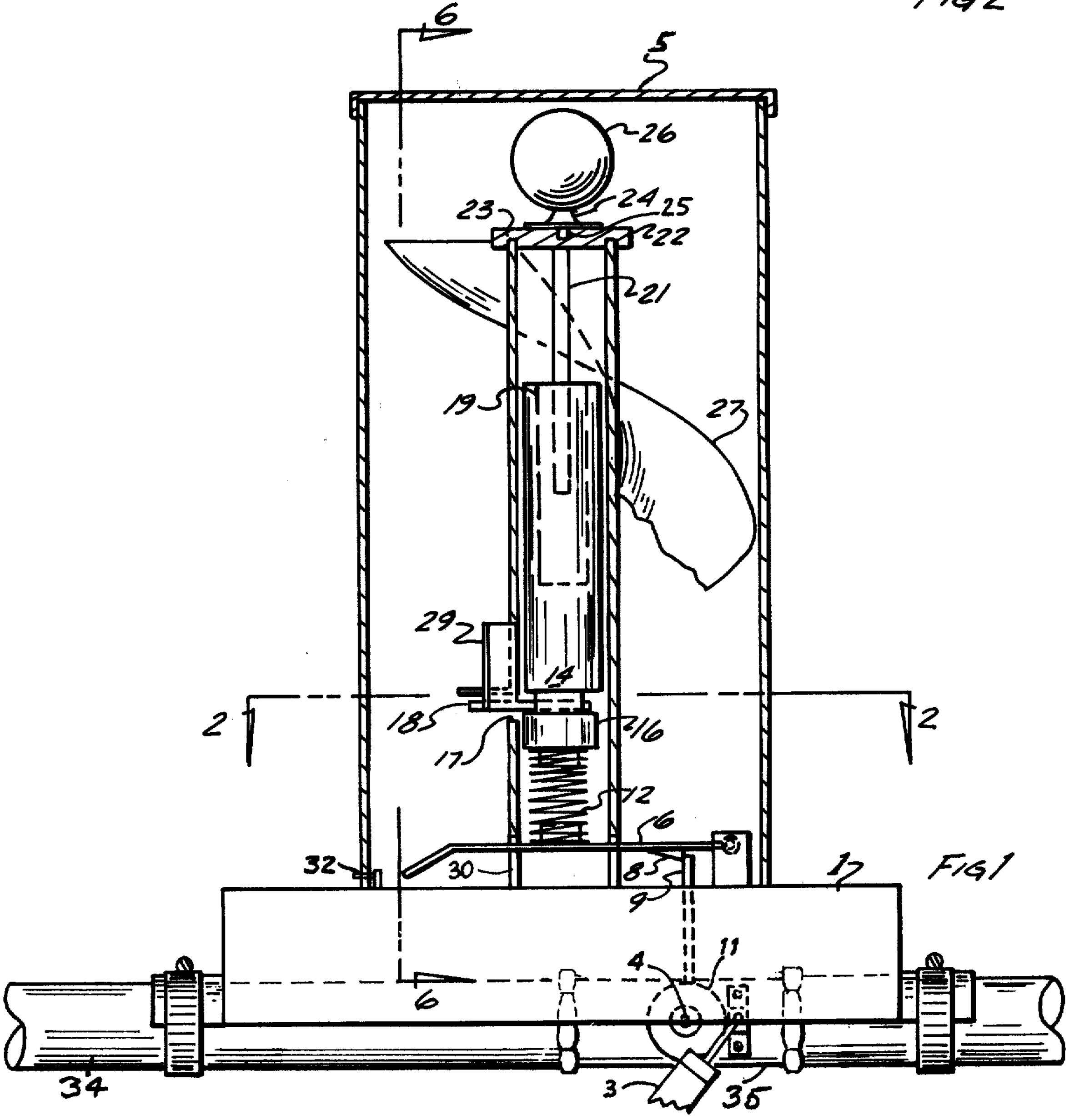
FIG. 1 is a sectional view of the device.
Figure 5:
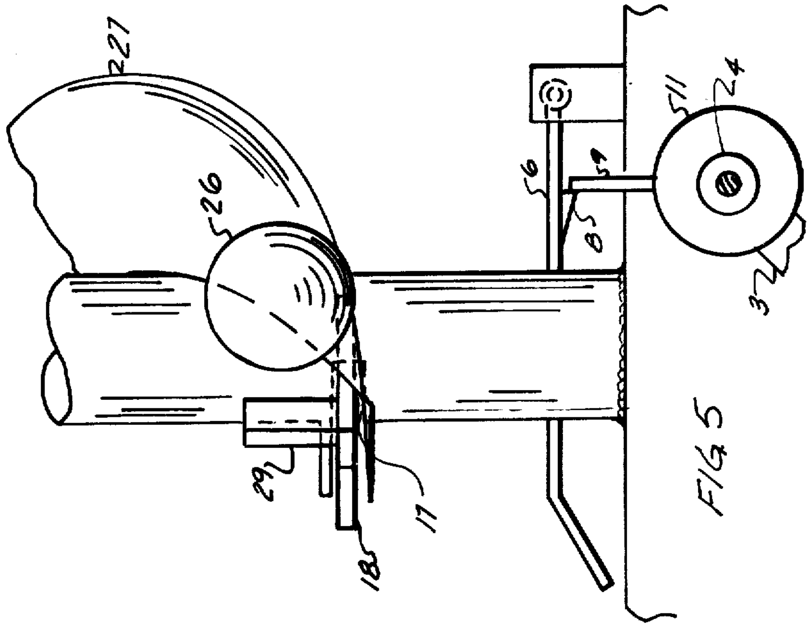
FIG. 5 is a fragmental view showing the device at the engagement of the ball with the trigger abutment.
Figure 9:
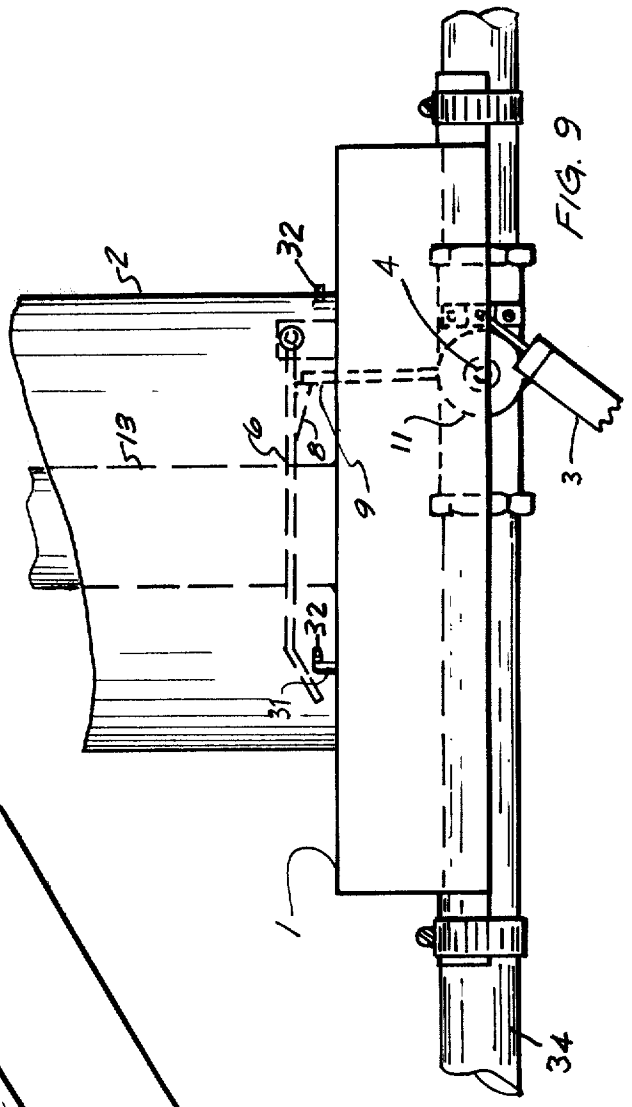
FIG. 9 is a fragmental side view showing a gas valve on the base connected to the actuating element of the device.

On the base 1 for an outer housing 2 is a spring-loaded actuating handle 3 mounted on a pivot 4 biased in a direction to urge the handle 3 to turn in a counter-clockwise direction, viewing FIG. 1 or FIG. 9. Inside the housing 2 is the control device for the handle 3 which includes a locking lever 6 pivoted at one end and extending generally horizontally. The locking lever 6 has a detent 8 which in the horizontal position of the lever 6 is in the path of a finger 9 extended from the hub 11 of the handle 3 so that in the locked position the detent 8 prevents the turning of the actuating handle 3. The outer housing 2 is covered by a removable top 5.

The locking lever 6 is held in position by a control device inside the housing 2. A coil spring 12 inside a tube 13 bears against the locking lever 6 and holds it in horizontal locking position. The coil spring 12 is compressed by a plunger pin 14 slideable in the tube 13. A groove 16 around the plunger pin 14 is aligned, in the compressed attitude of the spring 12, with a slot 17 in a side of the tube 13 so that a locking plate 18 extending through the slot engages the groove 16 to hold the plunger pin 14 in spring compressing position.

Bore 19 in the top of the plunger pin 14 accommodates a cocking pin 21 therein. A cap 22 on the outer end of the cocking pin 21 has a slip fit on and is engageable with the open top of the tube 13 as shown in FIG. 1. On the cap 22 is a suitable replaceable seat 24 having a stem 25. The seat 24 is formed in the shape of a portion of a sphere to seat a spherical ball 26 thereon. The cap 22 is drilled to accommodate the stems 25 of seats 24 of selected sizes and sensitivity.

A spiral guide 27 of at least one and one-half turns extends around the exterior of the tube 13. The guide surrounds the tube in such a manner that whenever excessive vibration unseats the spherical ball 26, the ball drops on the spiral guide and proceeds to roll downwardly thereon. The housing 2 is in close vicinity of the outer periphery or edge of the spiral guide 27 so as to prevent the spherical ball 26 from leaving the guide, and thus confines the spiral path on which the spherical ball 26 must travel.

The locking plate 18 is pivoted on a vertical pivot 28 and has an abutment flange 29 ascending upwardly so that in its usual position is in the path of the ball on the spiral guide 27. As the ball 26 rolls down the guide 27 it abuts the flange 29 and pushes the same away from the tube 13 thereby to withdraw the locking plate 18 from the groove 16 and free the plunger pin 14 to allow the expanding of the spring 12. This results in releasing the horizontal locking lever 6 and permits the actuating handle 3 to turn for performing its function of actuation.

Figure 4:
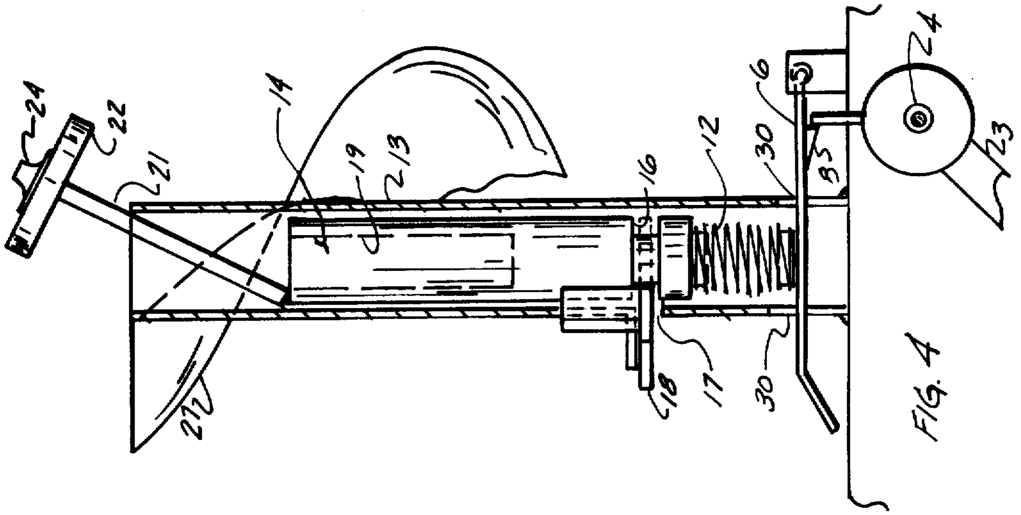
FIG. 4 is a somewhat diagrammatic view illustrating the final step of cocking the device.
Figure 3:
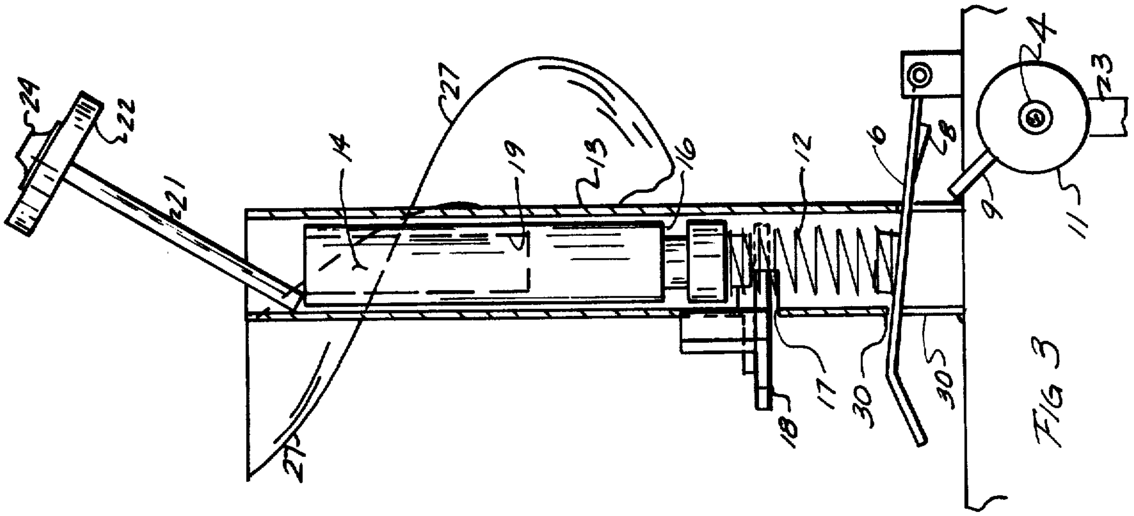
FIG. 3 is a somewhat diagrammatic view illustrating the first step for cocking the device.
Figure 7:
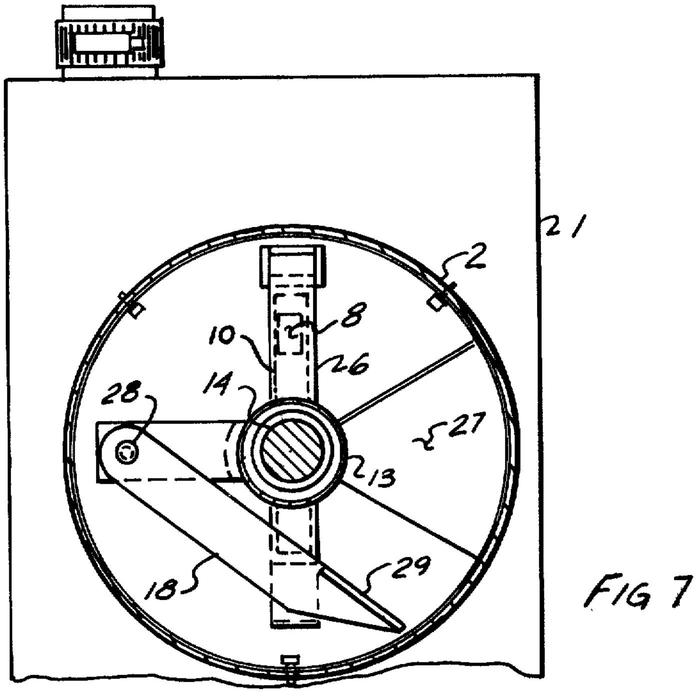
FIG. 7 is a cross-sectional view of the device in uncocked attitude, the section being taken along 7—7 of FIG. 6.
Figure 6:
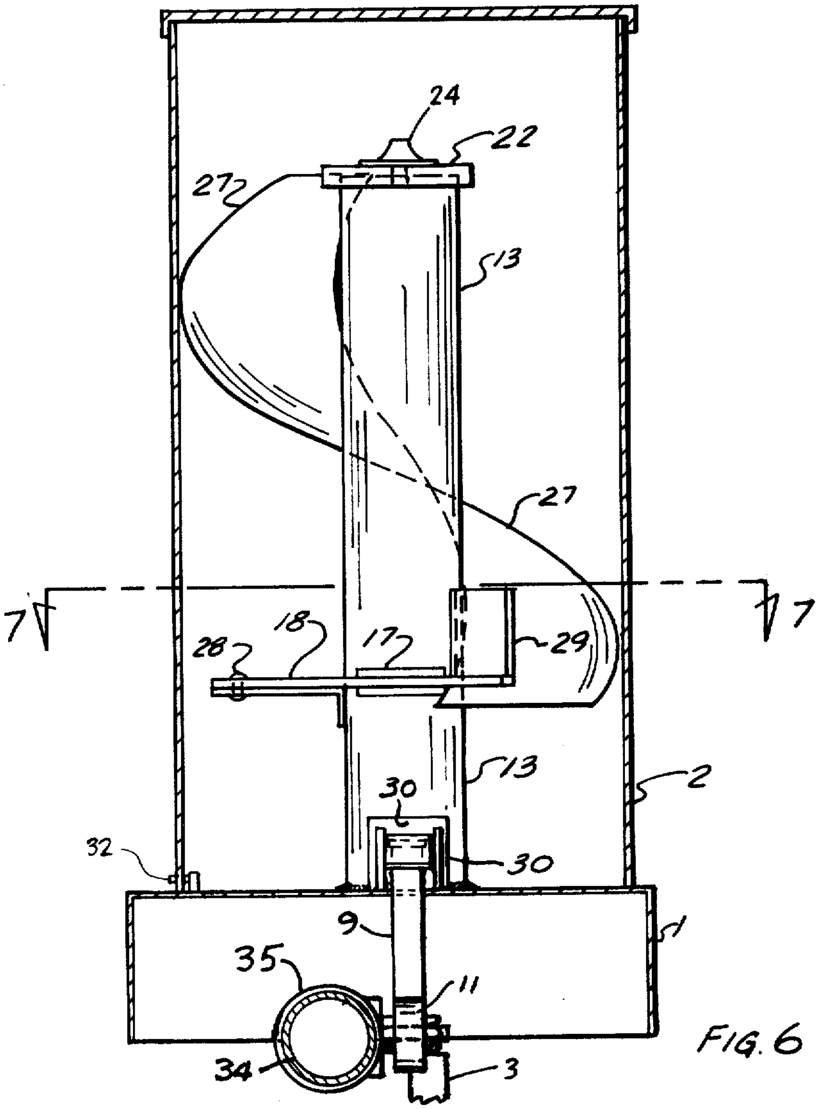
FIG. 6 is a sectional view of the device in uncocked attitude, viewing along lines 6—6 of FIG. 1.

The cocking of the device by the cocking pin 21 is illustrated in FIGS. 3 and 4. The cocking pin 21 is inserted through the open top of the tube 13 and against the top edge of the plunger pin 14 and it is pressed downwardly to compress the spring 12 until the groove 16 therein is in registry with the locking plate 18, so that the locking plate 18 is urged into engagement therewith. Then, the locking pin 21 is inserted into the hole 19 in the plunger pin 14 and the cap 22 is placed in position so that the spherical ball 26 can be placed on its seat 24. Thereafter, the housing 2 is placed on the base and locked in place, and finally, a top 5 is placed on the housing 2.

Figure 8:
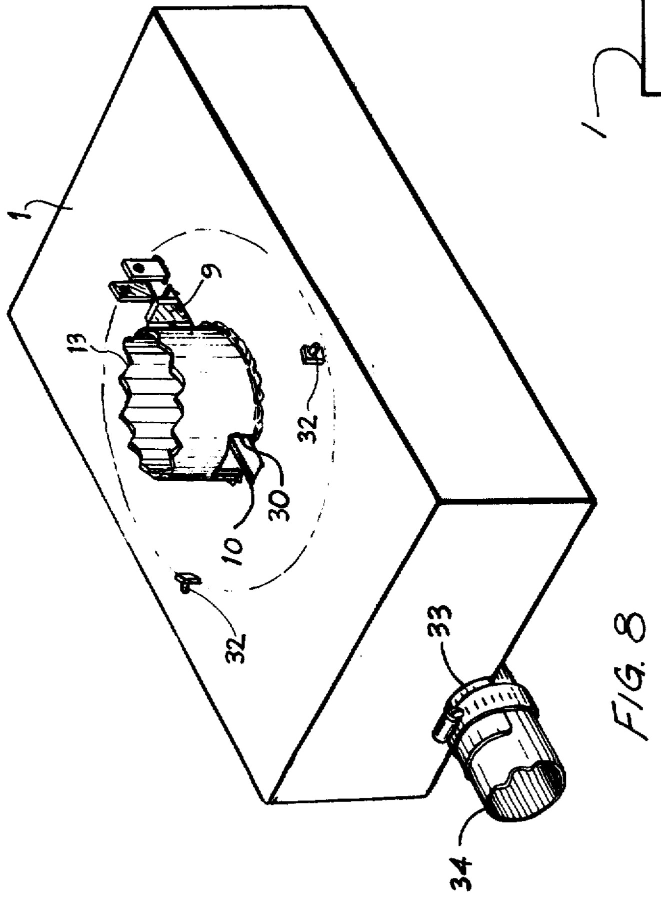
FIG. 8 is a perspective view of the base.

The housing 2 has three bayonet slots 31 in its lower edge to engage pins 32 as shown in FIGS. 8 and 9. Thus, after the function of this device is performed, the cover housing 2 is removed and the ball 26 removed from the spiral guide 27. The cap 23 is lifted from the tube 13 and the plunger pin 14 is returned to its cocked position as heretofore described. The actuating handle 3 on the valve 35 is turned clockwise to cause the finger 9 to engage the detent 8 on the lock lever 6. The ball 26 is then placed upon the seat 24, the outer housing 2 is installed and secured in place and the device is now ready for service.

In case of an earthquake, or excessive vibration that may require the turning off, for instance, a gas valve, or electrical switch to which the actuating handle 3 is suitably connected, the spherical ball 26 is dislodged and as it rolls down the spiral guide 27 it accelerates and acquires sufficient momentum that it strikes the abutment flange 29 with sufficient force to push it away from the tube 13 and withdraw the locking plate 18 from the groove 16 thereby instantly releases the plunger pin 14 and permit the coil spring 12 to expand. The resiliency of the spring loaded pivot 4 is sufficiently stronger spring action than the relieved coil spring therefore lifts the relieved spring 12, and the finger 9 pushes the detent 8 and the horizontal lever 7 out of the way to permit the turning movement of the actuating handle 3 for its actuating operation.

The horizontal locking lever 6 extends as shown, through the tube 13, which latter has suitable slots 30 to accommodate the movement of the lever 6. The base 1 as shown herein, has a recess 33 to accommodate a gas pipe 34 so that gas valve 35 is suitably connected to the actuating arm 3 for the operation herein described. The herein device is simple in structure and operation. It can be manufactured of inexpensive materials; for instance, of extruded plastics. The spring loaded activating handle 3 may be of any available standard spring loaded valve.

I claim:

1. In a safety device automatically operated by vibration, the combination with a support,
an actuating handle pivoted on the support and being connectable to a device to be actuated,
a column on said support,
a seat on the top of the column for a spherical ball,
a device for controlling said actuating handle including
a releasable holding element on the support,
coacting members on said releasable holding element and on said actuating handle for restraining said actuating handle in inoperative position,
resiliently compressible restraining means related to said column bearing on said releasable holding element to hold it in restraining position.
cocking means related to said column to cock said resiliently compressible restraining means in compressed position,
a catch member engaging said cocking means to hold it in cocked position,
a spiral guide around said column in operative relation to said column to receive and guide said spherical ball when dislodged by vibration,
an abutment member being in the path of said spherical ball on said spiral guide to be abutted by said ball and related to said catch member to move it out of engagement from said cocking means thereby to permit said resiliently compressed restraining means to cause said coacting members to move said holding element out of restraining position and free said actuating handle for actuation,
and means to urge said actuating handle into actuating position when freed.

2. The safety device specified in claim 1, and
said releasable holding element being a lever pivoted on said support, and said resiliently compressible restraining means being a coil spring compressed by said cocking means.

3. The safety device specified in claim 1, and
a housing on said frame in close vicinity of said spiral guide to confine the movement of said spherical ball to said spiral guide.

4. The safety device specified in claim 3, and
said column being tubular and said compressible restraining means being a coil spring in said tube,
said cocking means being a plunger in said tube for compressing said coil spring,
and said plunger having a keeper in its side engageable by said catch member to hold said plunger in cocked position.

5. The safety device specified in claim 4, and
said coacting parts on said actuating handle and on said releasable holding element being a finger extended from said actuating handle and a detent on said holding element obstructing said finger to prevent the swinging of said actuating handle.

6. The safety device specified in claim 4, and
said tubular column being open at its top for access to said plunger,
a cap on said open end, said seat being on said cap,
and an extension on said cap inward of said tube capable of engaging said plunger at will for pushing said plunger into cocking position.

7. The safety device specified in claims 3 or 4 or 5 or 6, and
detachable connection means between said housing and said support.

8. The safety device specified in claims 3, or 4 or 5 or 6, and
said support including a base,
and detachable means to connect said housing to said base.

* * * * *